United States Patent
Nguyen et al.

(10) Patent No.: US 10,300,430 B2
(45) Date of Patent: May 28, 2019

(54) COMPOSITE 3D-PRINTED REACTORS FOR GAS ABSORPTION, PURIFICATION, AND REACTION

(71) Applicant: LAWRENCE LIVERMORE NATIONAL SECURITY, LLC, Livermore, CA (US)

(72) Inventors: Du T. Nguyen, Fremont, CA (US); Roger D. Aines, Livermore, CA (US); Sarah E. Baker, Dublin, CA (US); William L. Bourcier, Livermore, CA (US); Eric B. Duoss, Dublin, CA (US); James S. Oakdale, Castro Valley, CA (US); Megan M. Smith, Livermore, CA (US); William L. Smith, Oakland, CA (US); Joshuah K. Stolaroff, Oakland, CA (US); Congwang Ye, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 15/468,297

(22) Filed: Mar. 24, 2017

(65) Prior Publication Data
US 2018/0272268 A1    Sep. 27, 2018

(51) Int. Cl.
| | | |
|---|---|---|
| B01D 53/14 | (2006.01) |
| B01J 13/20 | (2006.01) |
| B01J 20/28 | (2006.01) |
| B29C 64/20 | (2017.01) |
| B29C 70/58 | (2006.01) |
| B29K 83/00 | (2006.01) |
| B33Y 10/00 | (2015.01) |

(Continued)

(52) U.S. Cl.
CPC ..... *B01D 53/1493* (2013.01); *B01D 53/1475* (2013.01); *B01J 13/206* (2013.01); *B01J 20/2805* (2013.01); *B33Y 80/00* (2014.12); *B01D 2252/202* (2013.01); *B01D 2252/20405* (2013.01); *B01D 2252/20421* (2013.01); *B01D 2252/20484* (2013.01); *Y02C 10/06* (2013.01); *Y02C 10/08* (2013.01)

(58) Field of Classification Search
CPC .................................................. B01D 53/1475
See application file for complete search history.

(56) References Cited

U.S. PATENT DOCUMENTS

| | | |
|---|---|---|
| 8,361,195 B2 | 1/2013 | Aines et al. |
| 8,394,350 B2 | 3/2013 | Aines |

(Continued)

FOREIGN PATENT DOCUMENTS

| | | |
|---|---|---|
| WO | 2014-153535 A2 | 9/2014 |
| WO | 2016-154278 A1 | 9/2016 |

OTHER PUBLICATIONS

Vericella et al., "Encapsulated Liquid Sorbents for Carbon Dioxide Capture," Nature Comm., 2015, pp. 1-7.

(Continued)

*Primary Examiner* — Peter F Godenschwager
(74) *Attorney, Agent, or Firm* — Eddie E. Scott

(57) ABSTRACT

A composite material for gas capture, notably $CO_2$ capture and storage. The composite material includes a mixture of a solid or liquid reactive filler and a gas-permeable polymer such that the reactive filler forms micron-scale domains in the polymer matrix.

9 Claims, 10 Drawing Sheets

(51) Int. Cl.
*B33Y 30/00* (2015.01)
*B33Y 50/02* (2015.01)
*B33Y 70/00* (2015.01)
*B33Y 80/00* (2015.01)
*B29C 64/106* (2017.01)
*B29C 64/386* (2017.01)
*B29K 509/02* (2006.01)

(56) References Cited

U.S. PATENT DOCUMENTS

| | | |
|---|---|---|
| 8,834,605 B2 | 9/2014 | Aines |
| 9,062,586 B2 * | 6/2015 | Jiang ................ F01N 3/2828 |
| 2013/0243675 A1 * | 9/2013 | Halder ................ B01D 53/02 |
| | | 423/220 |
| 2015/0010461 A1 | 1/2015 | Cronin |
| 2016/0067891 A1 | 3/2016 | Worsley et al. |

OTHER PUBLICATIONS

International Search Report and Written Opinion for PCT/US2018/023889 corresponding to U.S. Appl. No. 15/468,297, 13 pages.

* cited by examiner

COMPOSITE 3D-PRINTED REACTORS FOR GAS ABSORPTION, PURIFICATION, AND REACTION

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to reactors for gas absorption, purification, and/or reaction and more particularly to composite 3-D printed reactors for gas absorption, purification, and/or reaction.

State of Technology

This section provides background information related to the present disclosure which is not necessarily prior art.

The exchange of gas into or out of a liquid is a common problem in the absorption of gases into a solvent for industrial chemical processes, gas purification, and water purification. The potentially largest scale application is for the absorption of $CO_2$ for carbon capture and storage from power plants. Other applications include purification of natural gas, purification of biogas, and various industrial gas-to-liquid reactions. The most common method for gas absorption is the use of a "packed tower" absorption column. The absorption column is typically a cylindrical reactor filled with a packing material. Liquid solvent is pumped to the top of the tower and allowed to flow down over the packing while gas is blown from the bottom of the tower in the opposite direction. The liquid solvent forms a film over the wetted parts of the packing material, resulting in a gas-liquid interface where the exchange between $CO_2$ and solvent takes place.

A major limitation of these tower packings is that the surface-area to volume ratio of the liquid is limited by the thickness of the liquid film. This thickness is determined by the properties of the solvent, but is typically around 1 mm. Additional area can be put into the tower using finer packings, but this leads to higher holdup of liquid, and impeded gas flow.

Solid sorbents are an alternative to liquid solvents in many applications, including large-scale $CO_2$ capture. Solid sorbents are preferred for air purification for, e.g. small submarines and personal underwater rebreathers and removal of volatile organic compounds emitted from certain industrial processes. Solid sorbents include mineral $CO_2$ sorbents like soda-lime, designer gas sorbents like metal-organic frameworks (MOFs), zeolites, and activated carbons. Solid sorbents are typically prepared in a powder, and must be pelletized or formed into monoliths with a binder, reducing accessible surface area and yielding sub-optimal gas flow.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventor's apparatus, systems, and methods provide a composite material for gas capture, notably $CO_2$ capture and storage. The composite material includes a mixture of a solid or liquid reactive filler and a gas-permeable polymer (e.g. silicone), such that the reactive filler forms micron-scale domains in the polymer matrix. In contrast to typical absorption schemes based on liquid solvents or solid sorbent powders, the composite materials can be fabricated into arbitrary fixed shapes via additive or conventional manufacturing. The gas-permeable polymer matrix acts as a gas-permeable support while the reactive filler acts as a gas sorbent or catalyst for chemical reactions. Control over the material shape allows for the patterning of high surface-area-to-volume ratio structures for fast reactivity while minimizing pressure drops typically associated with high surface area materials and packings. The inventor's apparatus, systems, and methods can be used for the absorption of gases or catalyzing chemical reactions involving a gas. This use can be tailored for specific applications such as $CO_2$ capture from power plants, $CO_2$ utilization, natural gas purification, biogas purification, and underwater rebreather applications. Specific gases and reactions can be targeted using different reactive fillers.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Figure 1:
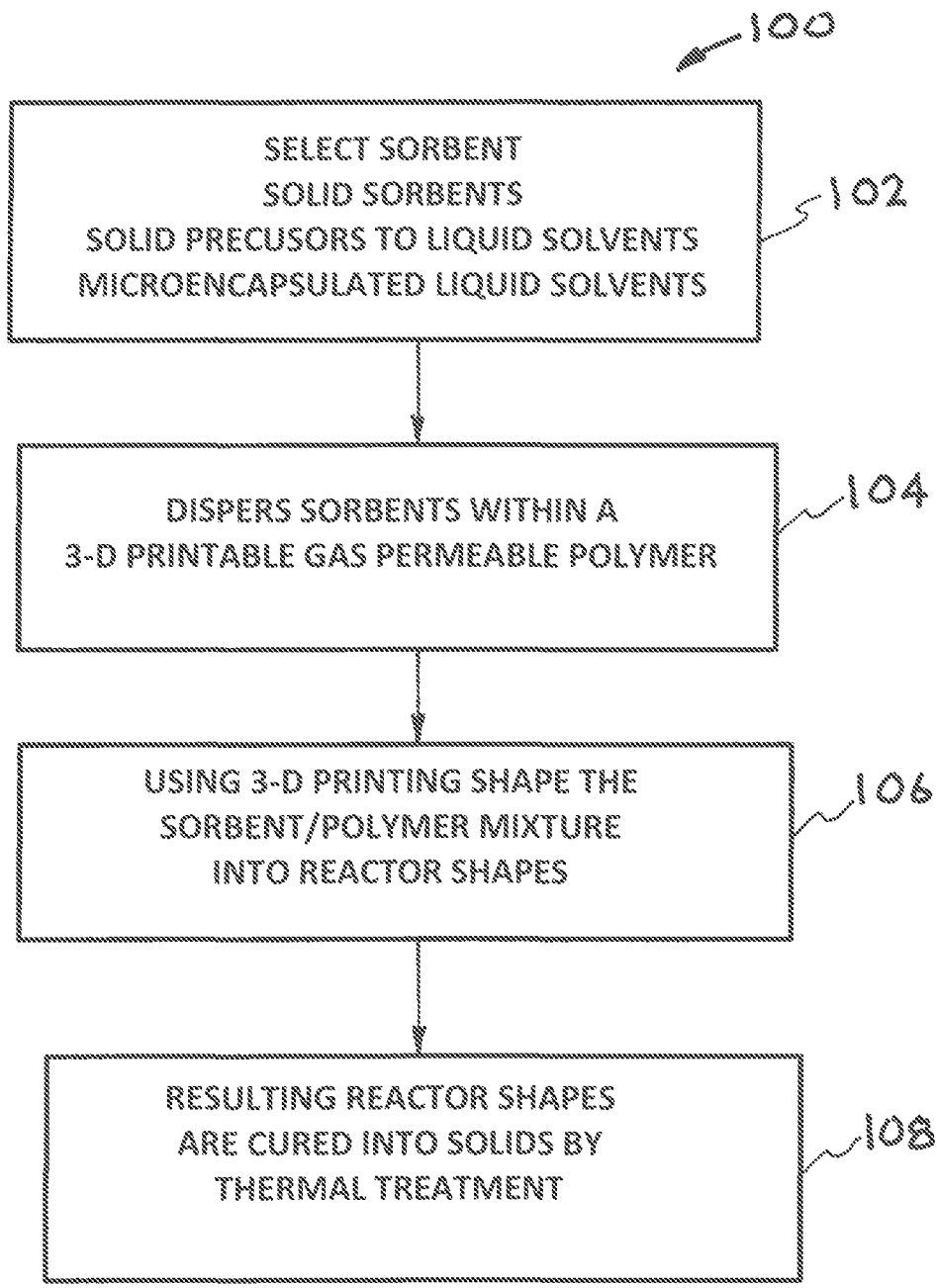
FIG. 1 is a flow chart illustrating one embodiment of the inventor's apparatus, systems, and methods.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the forms disclosed. The application covers all modifications, equivalents, and alternatives falling within the spirit and scope of the apparatus, systems, and methods as defined by the claims.

The inventor's apparatus, systems, and methods provide a high-surface-area, hierarchically-structured, reactive composite material for energy-efficient gas purification and the techniques to fabricate this material. The hierarchy consists of, on the one hand, micron-scale domains of solvent or sorbent particles embedded within a gas-permeable polymer to form the composite material and, on the other hand, the submillimeter-scale structures that the composite materials form to create a monolith reactor. The reactor has channels for optimal gas flow and features sized for fast reaction with the gas. The structure optionally consists of hollow tubes where a second solvent, for heat exchange or additional chemical reaction, is flowed through the tube cores.

The reactor is fabricated by dispersing solid sorbents, solid precursors to liquid solvents, or microencapsulated liquid solvents within a 3D-printable, gas-permeable polymer, and then printing or otherwise shaping the mixture into reactor structures. The composite material may contain other reactive components, such as a pH-indicator dye to give visual indication of $CO_2$ absorption. Various structures can be printed that have desired properties for gas flow, fit into desired reactor housings, or provide other benefits. Features at the centimeter or larger scale can be incorporated into the printed structure, such as a hierarchy of gas channel sizes. The inventors have shown that the resulting structures absorb $CO_2$ much faster than comparable films of the liquid solvent, indicating much smaller and more efficient reactors are possible using the printed composite concept than with conventional technology. The $CO_2$ absorption rates are higher for smaller filament sizes (which have higher surface area-to-volume ratios) and they approach or exceed the absorption rates for the microencapsulated solvents we have previously developed. Though the inventors' research focus is on $CO_2$ capture and early demonstrations use sodium carbonate. This invention is widely applicable to other solvents, other reactions, and other applications involving gas purification or heterogeneous reactions involving a gas.

Several key innovations underpin the inventor's apparatus, systems, and methods:

1. The method of preparing a gas-absorbing composite material, i.e. by mixing solid precursors to liquid solvents with a gas-permeable polymer precursor, cross-linking the polymer, and then hydrating the solid particles to form micro-scale solvent domains. This innovation is not specific to 3-D printing (it can be achieved by extrusion or other conventional manufacturing techniques), but it is specific to solvents that can be dispersed as solid powders and then re-hydrated, solid sorbents, or microencapsulated solvents.

2. The concept of preparing and 3-D printing a gas-absorptive ink into a monolith reactor with beneficial gas-flow features. This innovation is not specific to liquid solvents and can be applied to absorptive or reactive powders that remain solid, such as metal-organic frameworks.

3. The formation of a composite material as in concepts 1 or 2 into hollow-tube structures, where a second liquid is flowed through the center of the tubes for the purpose of heat exchange. The tubes can be printed with a Direct Ink Write 3-D printing system equipped with core-shell nozzles for printing hollow or liquid-filled tubes.

Referring now to the drawings, and in particular to FIG. 1, an embodiment of the inventor's apparatus, systems, and methods is shown. This embodiment is designated generally by the reference numeral 100. The inventor's apparatus, systems, and methods 100 provide a high-surface-area, hierarchically-structured, reactive composite material for energy-efficient gas purification and the techniques to fabricate this material. The hierarchy consists of, on the one hand, micron-scale domains of solvent or sorbent particles embedded within a gas-permeable polymer to form the composite material and, on the other hand, the submillimeter-scale structures that the composite materials form to create a monolith reactor. The reactor has channels for optimal gas flow and features sized for fast reaction with the gas. The structure optionally consists of hollow tubes where a second solvent, for heat exchange or additional chemical reaction, is flowed through the tube cores.

A flow chart illustrates the inventor's apparatus, systems, and methods 100. The flow chart illustrates a number of individual steps that encompass the inventor's apparatus, systems, and methods 100.

Step 102 comprises selecting the sorbents. For example, the sorbents can be mixing solid precursors to liquid solvents with a gas-permeable polymer precursor, cross-linking the polymer, and then hydrating the solid particles to form micro-scale solvent domains.

Step 104 comprises dispersing the sorbent material within a 3D printable gas permeable polymer. The inventor's apparatus, systems, and methods are not specific to liquid solvents and can be applied to absorptive or reactive powders that remain solid, such as metal-organic frameworks.

Step 106 comprises 3-D printing and shaping the sorbent material within a 3D printable gas permeable polymer into a monolith reactor with beneficial gas-flow features. The inventor's apparatus, systems, and methods are limited to specific to 3-D printing (it can be achieved by extrusion or other conventional manufacturing techniques), but it is specific to solvents that can be dispersed as solid powders and then re-hydrated, solid sorbents, or microencapsulated solvents.

Step 108 comprises curing the monolith reactor by thermal treatment.

Figure 2:
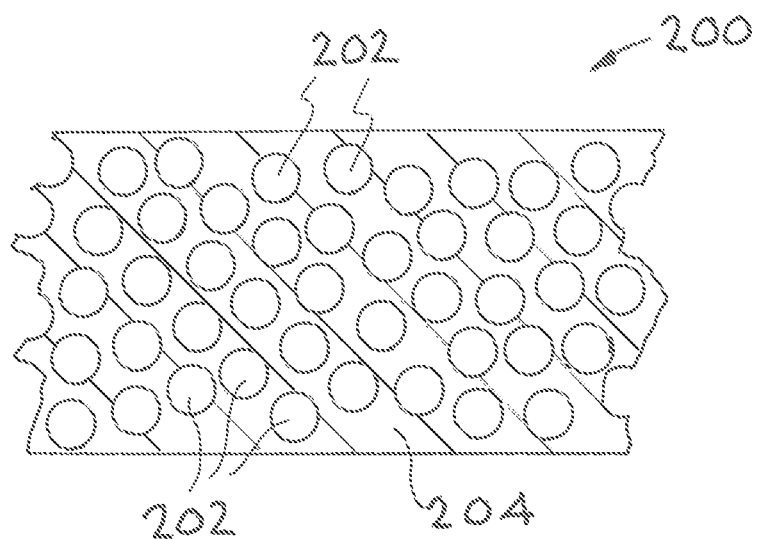
FIG. 2 illustrates one embodiment of the inventors' ink that can be used to create a monolith reactor.

Referring now to FIG. 2, one embodiment of the inventors' ink that can be used to create a monolith reactor is shown. This embodiment of the inventors' ink is designated by the reference numeral 200. The ink 200 includes sodium carbonate particles 202 in uncured silicone oil 204. The sodium carbonate particles 202 were produced by milling solid sodium carbonate to a fine powder of ~10-micron average diameter. The sodium carbonate particles 202 were then mixed with an uncured silicone oil 204, for example (e.g. Dow Corning® SE1700) via planetary mixing. The resulting ink 200 was supplied to a Direct Ink Write device for 3-D printing into desired structures. The completed structure was then cured. The sodium carbonate particles 202 can be considered solid particles for some operations and the sodium carbonate particles 202 can become liquid units when the sodium carbonate is exposed to moisture.

Figure 3:
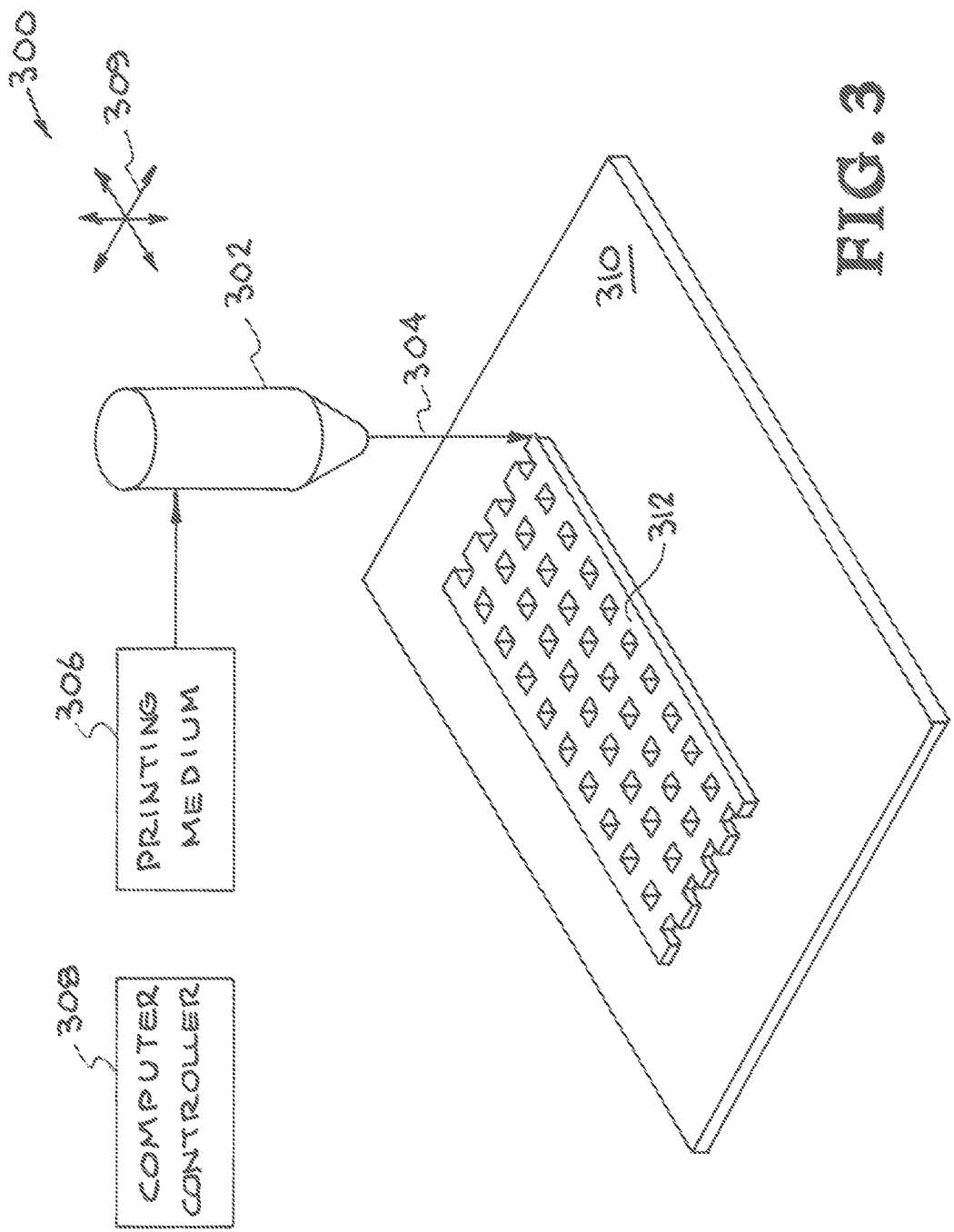
FIG. 3 an embodiment of the inventor's 3D printing and otherwise manufacturing of a monolithic reactor is illustrated.

Referring now to FIG. 3, an embodiment of the inventor's 3D printing and otherwise manufacturing of a monolithic reactor is illustrated. As illustrated in FIG. 3, extruded material 304 is deposited on a surface 310 to be printed by print head 302. For example, the extruded material 304 can be composed of the ink illustrated in FIG. 2.

The print head 302 extrudes the material 304 onto the surface 310. Movement of the print head 302 is controlled by computer controller 308 which provides freedom of movement along all axes as indicated by the arrows 309. The instructions for creating the reactor 312 is fed to the computer controller 308. The computer controller 308 uses the instructions to move the print head 302 through a series of moments along the surface 310 forming the reactor 312.

Figure 4:
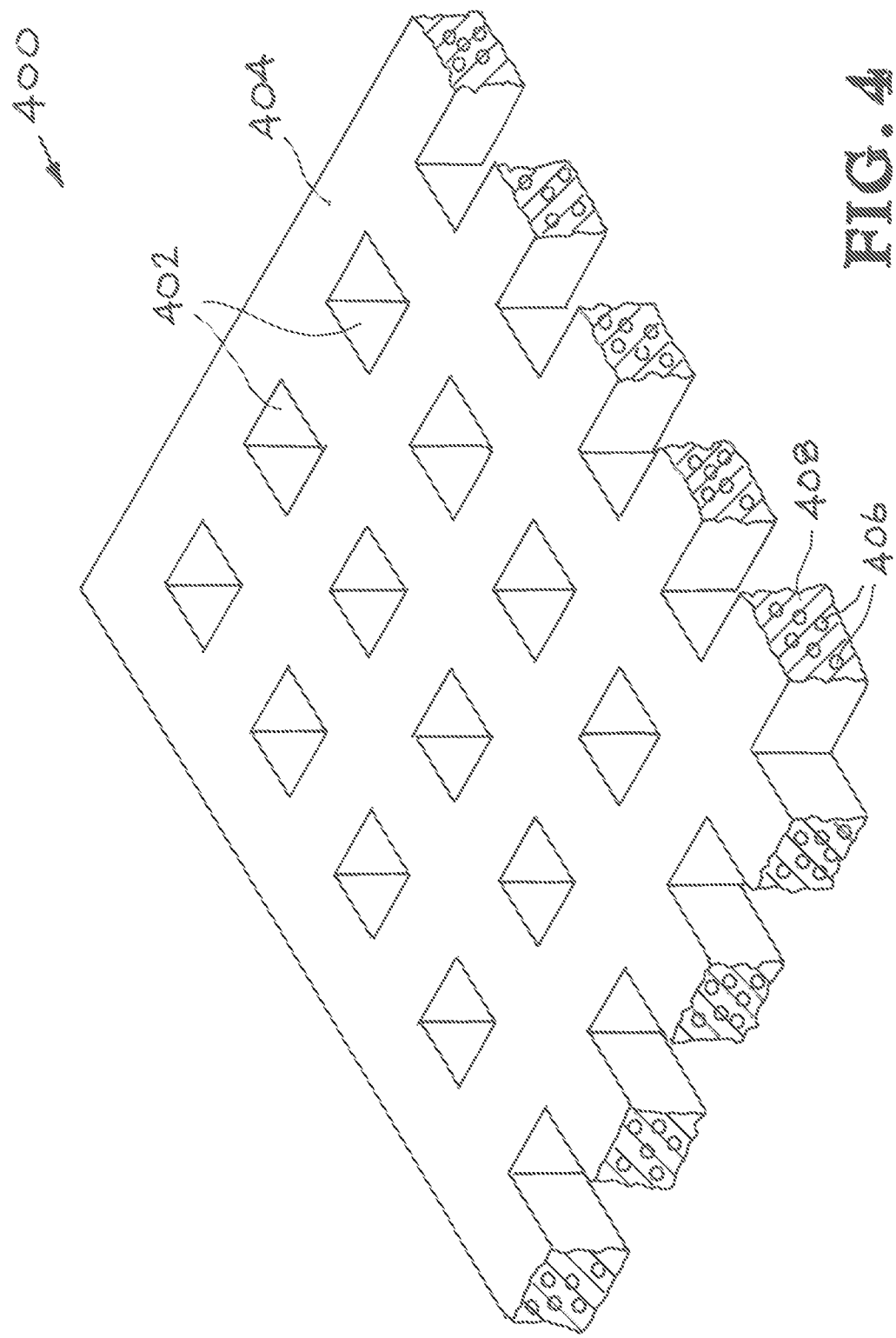
FIG. 4 illustrates an embodiment of the inventor's monolith reactor.

Referring now to FIG. 4 an embodiment of the inventor's monolith reactor is illustrated. This embodiment is designated generally by the reference numeral 400. The reactor 400 has channels 402 for optimal gas flow and features sized for fast reaction with the gas. The structure can also be optionally constructed to consist of hollow tubes where a second solvent, for heat exchange or additional chemical reaction, is flowed through the tube cores.

As illustrated in FIG. 4, individual channels 402 are made by the shape of the structure 404. The structure is made of micron-scale domains of solvent and/or sorbent particles embedded within a gas-permeable polymer to form the monolith reactor. The structure 404 includes gas-permeable particles 406 and a solvent matrix 408. This an embodiment 400 of the inventor's monolith reactor is a lattice like structure. The physical dimensions can be varied by length, width, and height. A smaller filament size yields a higher surface to volume ratio and faster $CO_2$ absorption rates.

The inventors' ink that is used to create a monolith reactor includes solid or liquid reactive filler and a gas-permeable polymer, such that the reactive filler forms micron-scale domains in the polymer matrix. The solid particle reactive filler is illustrated in FIGS. 2 and 4.

Figure 5:
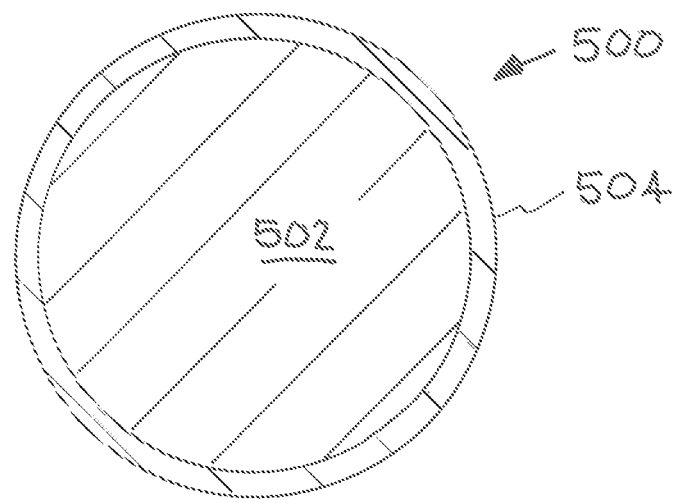
FIG. 5 illustrates spheres containing liquid stripping solvent for carbon dioxide removal.

Referring now to FIG. 5, one embodiment of the inventors' liquid reactive filler is illustrated. The inventors' liquid reactive filler utilizes individual spheres that are capsules with liquid stripping solvents for absorbing $CO_2$ encapsulated within the capsules. One of the capsules 500 is shown in FIG. 5. The capsule 500 has a polymer surface layer 504 that is permeable to carbon dioxide. A liquid stripping solvent 502 for absorbing $CO_2$ is encapsulated within the polymer surface layer 504 of the spheres 500.

Figure 6:
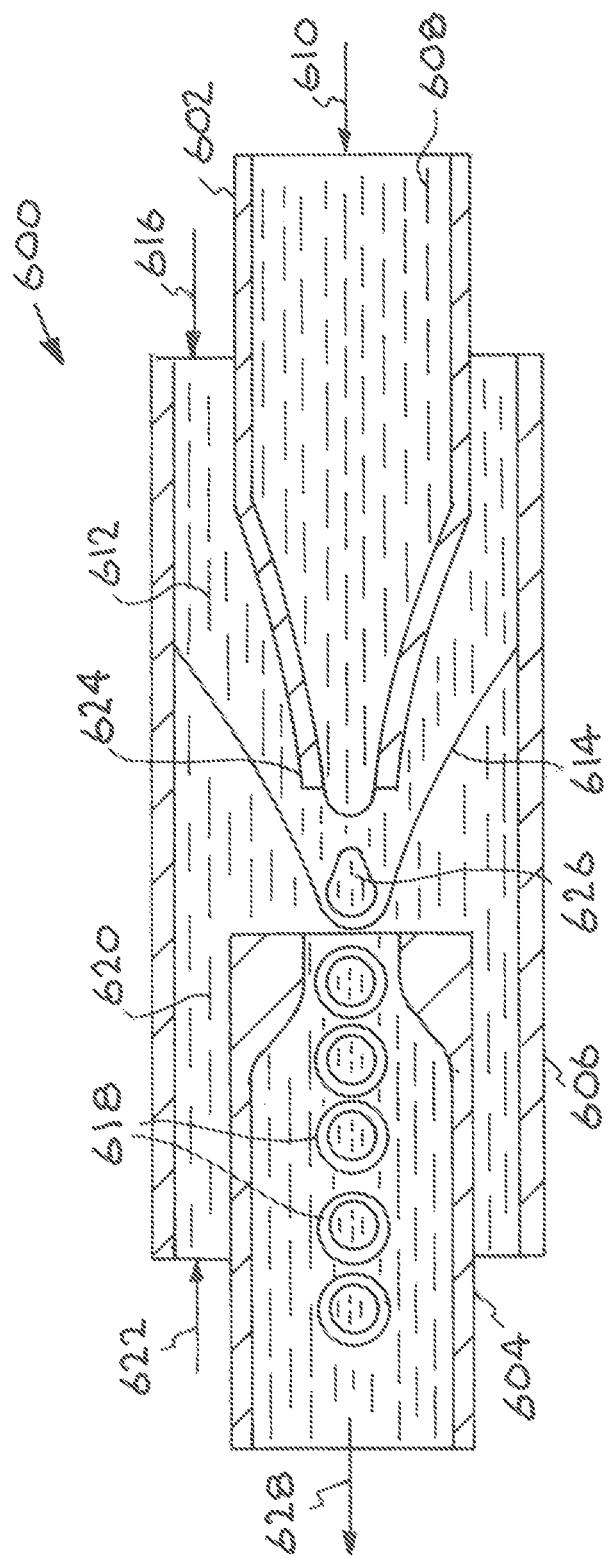
FIG. 6 is an illustration of a system for making the spheres.

Referring now to FIG. 6, a system for making the spheres is illustrated. The system for making the spheres is designated generally by the reference numeral 600. The individual spheres have a polymer surface layer that is permeable to carbon dioxide and have liquid stripping solvents for absorbing carbon dioxide encapsulated within the polymer surface layer and inside the spheres.

One specific example of a system for making the spheres is shown in FIG. 6. The schematically illustrated method 600 is composed of the following items. An injection tube 602 with a ID (um) and OD 1000 (um), a collection tube 604 with an ID of 500 (um) and OD 1000 (um) and an outer tube 606 of square cross section with ID of 1000 (um) and ID of 1200 (um).

In operation, the inner fluid 610 (Monoethanolamine/$H_2O$) with a viscosity of 10-50 (cP) and a flow rate of 200-800 (uLh−1) flows in the injection tube 602 in the direction indicated by the inner fluid arrow. As this fluid proceeds it passes thru a droplet forming nozzle 624. The formed droplet 626 is released from the nozzle 602 and becomes encased in the middle fluid 612 (Norland Optical Adhesive Pre-polymer) with a viscosity of 10-50 (cP) and flow rate of 200-800 (uLh−1), the middle fluid 612 is flowing in the direction indicated by arrow 616. The inner fluid droplet 626 becomes encased in the middle fluid 612 forming encapsulated microcapsules 618 that have a $CO_2$ capturing solvent core with a thin $CO_2$ permeable outer shell. The outer fluid (Polyvinyl Alcohol Stabilizer) with a viscosity of 10-50 (cP) and a flow rate of 200-800 (uLh−1) flowing in the outer tube 606 in the direction indicated by arrow 622. This outer fluid 620 carries the fabricated microcapsules 618 into the collection tube 604. There is a boundary layer 614 that prevents the middle fluid 612 and outer fluid 620 from mixing as they have a large difference in both their viscosity and flow rates. The above described method will produce Microcapsules of a controlled size with an inner fluid (solvent/catalyst) enclosed in a $CO_2$ permeable polymer shell. The fabricated microcapsules 618 move out of the system as indicated by arrow 628.

Figure 7:
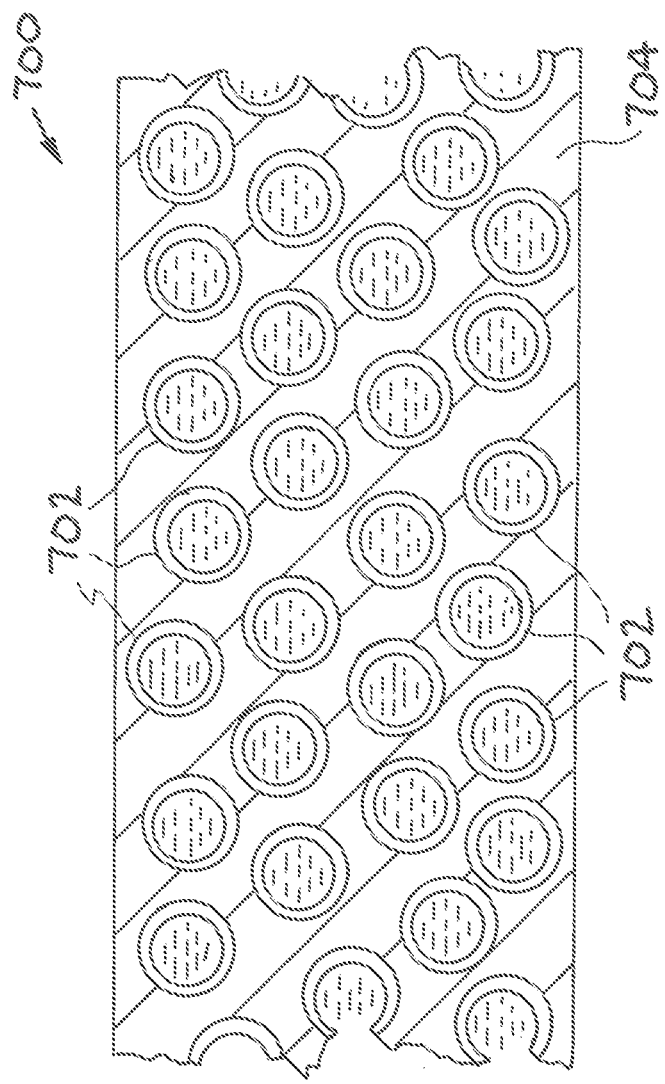
FIG. 7 illustrates another embodiment of the inventors' ink that can be used to create a monolith reactor.

Referring now to FIG. 7, another embodiment of the inventors' ink that can be used to create a monolith reactor is shown. This embodiment of the inventors' ink is designated by the reference numeral 700. The ink 700 includes spherical capsules 702 in a gas-permeable polymer 704. The spherical capsules 700 have a polymer surface layer that is permeable to carbon dioxide and a liquid stripping solvent for absorbing $CO_2$ encapsulated within the polymer surface layer. The resulting ink 700 can be supplied to a Direct Ink Write device for 3-D printing into desired structures.

Figure 8:
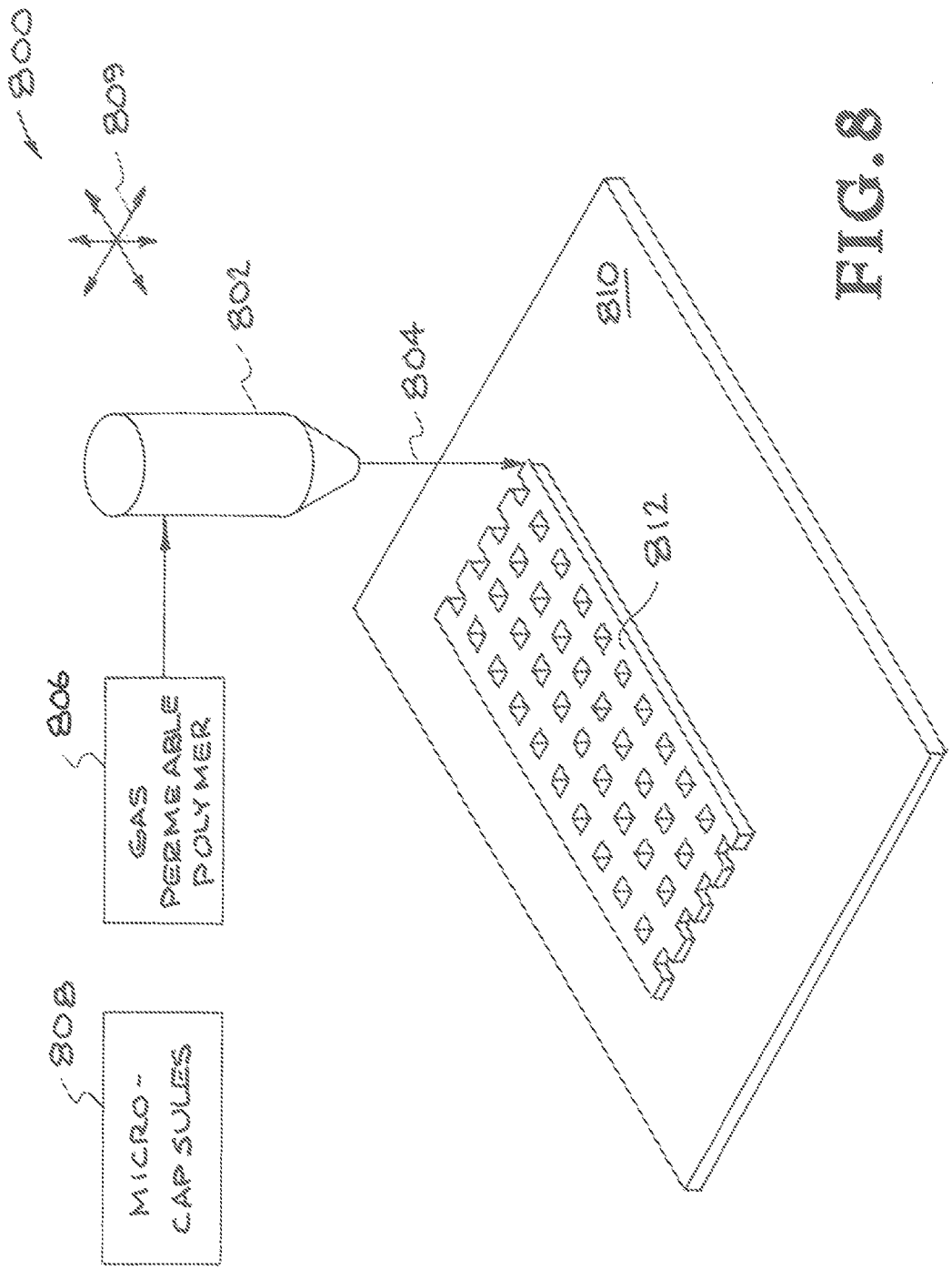
FIG. 8 is an illustration of an additive manufacturing system for making an embodiment of the monolithic reactor.

Referring now to FIG. 8, another embodiment of the inventors' 3-D printing for manufacturing a monolithic reactor is illustrated. As illustrated in FIG. 8, extruded material 804 is deposited on a surface 810 to be printed by print head 802. For example, the extruded material 804 can be composed of the ink illustrated in FIG. 7.

The print head 802 extrudes the material 804 onto the surface 810. Movement of the print head 802 is controlled by computer controller 808 which provides freedom of movement along all axes as indicated by the arrows 809. The instructions for creating the reactor 812 is fed to the computer controller 808. The computer controller 808 uses the instructions to move the print head 802 through a series of moments along the surface 810 forming the reactor 812.

Figure 9:
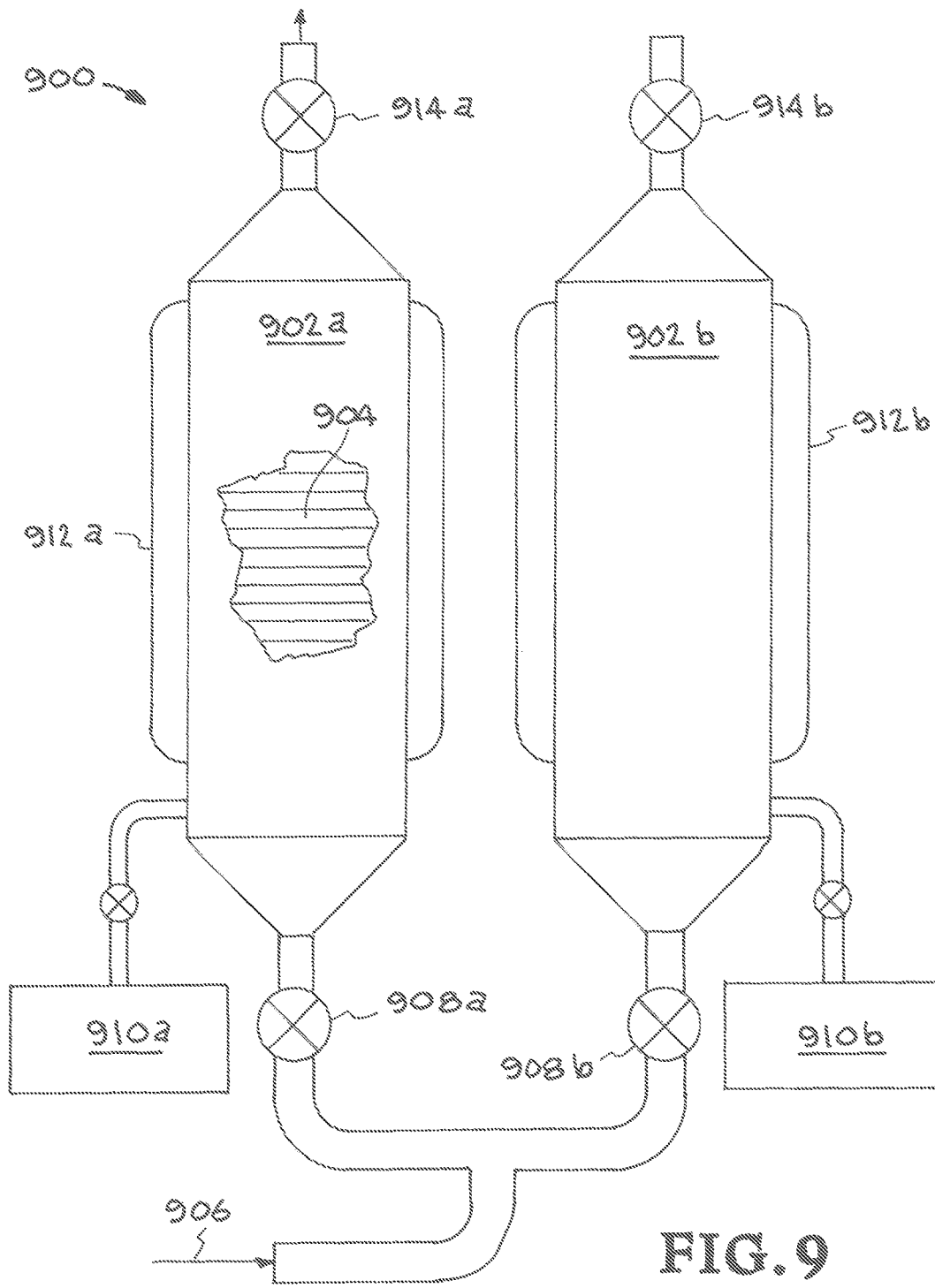
FIG. 9 illustrates an embodiment of a system utilizing the inventor's reactor for removing the target gas from a fluid or mixture and regenerating the reactor.

Referring now to FIG. 9, an embodiment of a system utilizing the inventor's reactor for (1) removing the target gas from a fluid or mixture and (2) for regenerating the reactor to remove the captured target gas from the reactor and getting it ready for another cycle of removing target gas from a fluid or mixture. This embodiment is designated generally by the reference numeral 900.

The system 900 uses a stack 904 of reactors in cylindrical rector vessels 902a and 902b for removing the target gas from a fluid or mixture. An example of using the reactor for removing a target gas from a fluid or mixture include use in the capture of carbon dioxide from gas mixtures containing carbon dioxide (examples: fossil fuel plants, natural gas streams, air). Also, the system 900 can be used for removing and/or capturing other gases including nitrous oxides (NOx), sulphates (SOx), hydrogen sulfide, or other trace gases.

The target gas in a fluid or mixture 906 is directed to one of the reactor vessels 902a or 902b. This is accomplished by selectively using the valves 908a and 908b to channel the target gas in a fluid or mixture to the selected reactor vessel. The target gas in a fluid or mixture passes through the selected reactor stack and the reactive material in the reactor removes the gas. The fluid or mixture exits the system through valve 914a or 904b.

The reactors in the stack 904 of reactors needs to be purged of the trapped target gas. This can be accomplished using the temperature control system 912a and/or 912b and the purge system 910a and/or 910b. Once the reactors in the stack 904 of reactors have been purged of the trapped target gas they are ready for reuse. This is accomplished by selectively using the valves 908a and 908b to channel another target gas in a fluid or mixture to the reactor vessel with the purged reactors.

Figure 10:
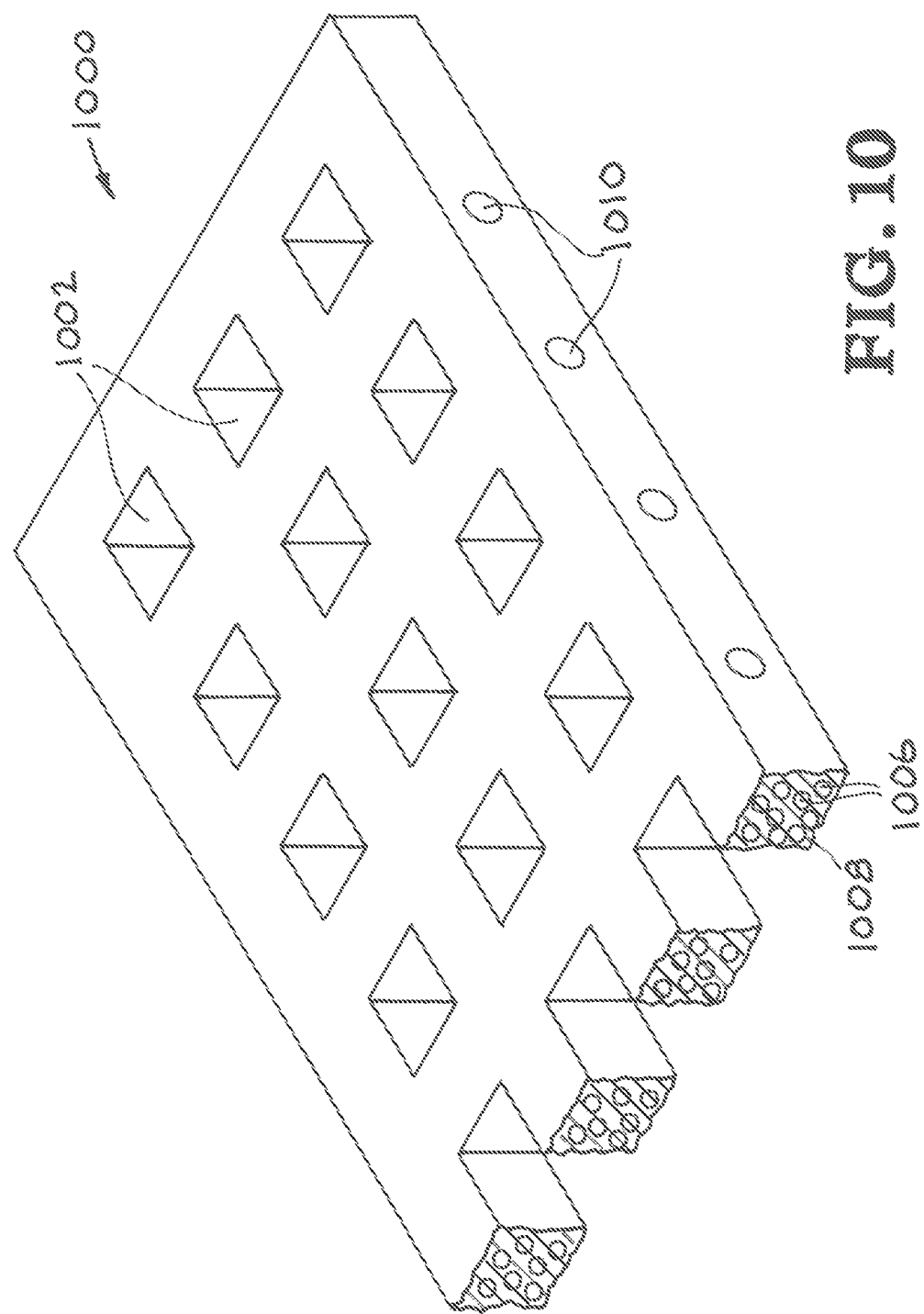
FIG. 10 illustrates another embodiment of the reactor.

As illustrated in FIG. 10, another embodiment of the reactor is illustrated. This embodiment is designated generally by the reference numeral 1000. The reactor 1000 includes individual channels 1002 formed by the shape of the structural members 1004. The structure is made of micron-scale domains of solid or liquid sorbent units 1006 embedded within a gas-permeable polymer 1008 to form the monolith reactor 1000. The physical dimensions can be varied by length, width, and height. A smaller filament size yields higher surfaced to volume ration and faster absorption rates. Temperature control tubes 1010 are in the structural members 1004. The coolant tubes can be used for heat exchange and for recycling the reactors.

Figure 11:
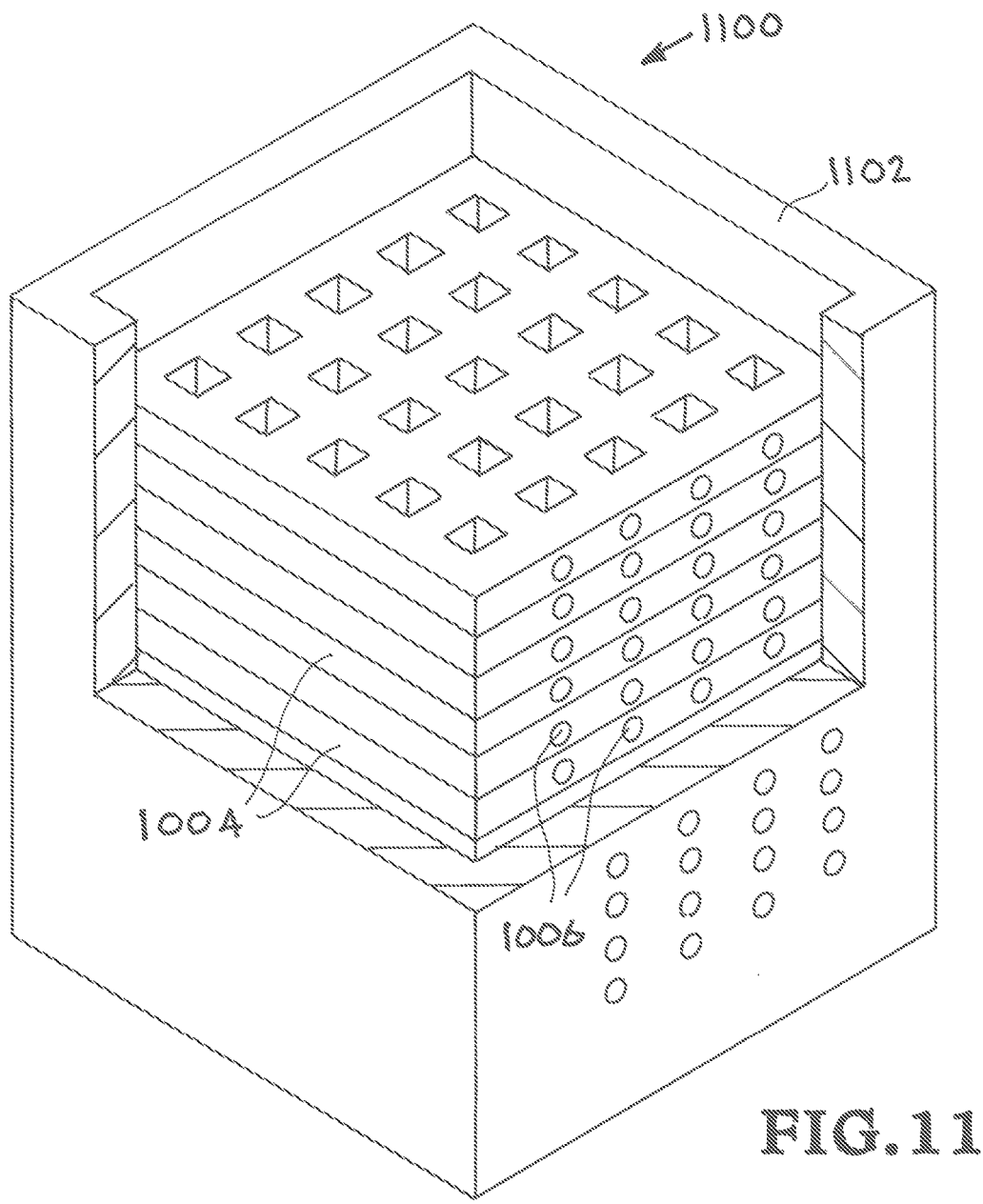
FIG. 11 illustrates an embodiment of a reactor stack.

Referring now to FIG. 11, an embodiment of a reactor stack is illustrated. This embodiment is designated generally by the reference numeral 1100. A reactor vessel 1102 contains reactors in a reactor stack 1104. Coolant tubes 1106 are in the individual reactors. The target gas in a fluid or mixture is directed through the reactor stack 1004 wherein the stripping solvent in the individual reactors removes the target gas.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of-whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. A method of making a reactor for removing carbon dioxide from a gas containing the carbon dioxide, comprising the steps of:
   providing a sorbent material;
   providing a gas-permeable polymer;
   combining said sorbent material and said gas-permeable polymer to produce a 3-D ink;
   using a 3-D print head of a 3-D printer to extrude said 3-D ink onto a surface;
   controlling said 3-D print head to extrude said 3-D ink onto said surface to form a green form of the reactor; and
   curing said green form of the reactor to produce the reactor.

2. The method of making a reactor for removing carbon dioxide from a gas containing the carbon dioxide of claim 1 wherein said step of providing a sorbent material comprises providing particles of carbon dioxide stripping material.

3. The method of making a reactor for removing carbon dioxide from a gas containing the carbon dioxide of claim 1 wherein said step of providing a sorbent material comprises providing particles of carbon dioxide stripping material encapsulated in capsules.

4. The method of making a reactor for removing carbon dioxide from a gas containing the carbon dioxide of claim 1 wherein said step of providing a sorbent material comprises providing particles of carbon dioxide stripping material encapsulated in spherical capsules that have a gas-permeable polymer surface layer encapsulating said particles of carbon dioxide stripping material.

5. The method of making a reactor for removing carbon dioxide from a gas containing the carbon dioxide of claim 1 wherein said step of providing a sorbent material comprises providing liquid units of carbon dioxide stripping material.

6. The method of making a reactor for removing carbon dioxide from a gas containing the carbon dioxide of claim 5 wherein said step of providing liquid units of carbon dioxide stripping material comprises providing solid units of carbon dioxide stripping material and hydrating said solid units of carbon dioxide stripping material to provide said liquid units of carbon dioxide stripping material.

7. The method of making a reactor for removing carbon dioxide from a gas containing the carbon dioxide of claim 1 wherein said step of providing a sorbent material comprises providing liquid droplets of carbon dioxide stripping material encapsulated in capsules.

8. The method of making a reactor for removing carbon dioxide from a gas containing the carbon dioxide of claim 1 wherein said step of providing a sorbent material comprises providing liquid droplets of carbon dioxide stripping material encapsulated in spherical capsules that have a gas-permeable polymer surface layer encapsulating said liquid droplets of carbon dioxide stripping material.

9. The method of making a reactor for removing carbon dioxide from a gas containing the carbon dioxide of claim 1 wherein said step of providing a gas-permeable polymer comprises providing uncured silicone.

\* \* \* \* \*